UNITED STATES PATENT OFFICE 1,955,882

PROCESS OF PREPARING ACETOETHYL ALCOHOL

Josef Hilger, Leverkusen-Wiesdorf, Germany, assignor to I. G. Farbenindustrie Aktiengesellschaft, Frankfort-on-the-Main, Germany No Drawing. Application July 23, 1932, Serial No. 624,355. In Germany August 13, 1931

4 Claims. (Cl. 260—134)

The present invention relates to a process of preparing acetoethyl alcohol.

It has been described in literature that on treating 1.3-butyleneglycol in the gaseous state with a dehydrogenating agent there is obtained methylethylketone.

In accordance with my present invention there is prepared acetoethyl alcohol from 1.3-butyleneglycol by treating the same in the gaseous state and under reduced pressure with a dehydrogenating catalyst at an elevated temperature.

The process is generally carried out by passing the 1.3-butyleneglycol in the gaseous state over or through one of the known dehydrogenating catalysts (compare f. i. Sabatier, Die Katalyse in der org. Chemie, pages 189, 192, 202) at a temperature between about 180–250° C. and a mercury pressure at most about 40 mms., say between about 20 and about 40 mms.

The reaction proceeds according to the following equation:

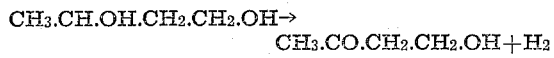

$$CH_3.CH.OH.CH_2.CH_2.OH \rightarrow CH_3.CO.CH_2.CH_2.OH + H_2$$

The invention is illustrated by the following example, without being limited thereto:

Example.—Through a catalyst prepared by fixing a freshly precipitated basic copper carbonate with water glass to a carrier, such as pumice stone or burnt clay, drying and reducing in a hydrogen stream at a temperature of 180° C., there is passed a stream of 1.3-butyleneglycol vapor (250 grams per hour and per litre contact room) at a temperature between about 200 and 220° C. and a mercury pressure of 25 mms. The reaction mixture escaping from the contact room is condensed in the usual manner and contains besides some starting 1.3-butyleneglycol, which may be reintroduced into the process, acetoethyl alcohol in a good output and small quantities of by-products.

Similar results are obtainable when working with a catalyst without a carrier or when working in the absence of an alkaline acting substance, for example, with a catalyst which is obtainable by impregnating pumice stone with a solution of cupric formate to which has been added some zinc formate, and drying the mass.

I claim:

1. The process of preparing acetoethyl alcohol which comprises treating 1.3-butyleneglycol in the gaseous state with a dehydrogenating catalyst at a mercury pressure of at most about 40 mms. and a temperature between about 180 and about 250° C.

2. The process of preparing acetoethyl alcohol which comprises treating 1.3-butyleneglycol in the gaseous state with a dehydrogenating catalyst at a mercury pressure of between about 20 and about 40 mms. and a temperature between about 180 and about 250° C.

3. The process which comprises passing a stream of 1.3-butyleneglycol vapor in a quantity of 250 grams per hour and per litre contact room through a dehydrogenating catalyst at a temperature between about 200 and about 220° C. and a mercury pressure of about 25 mms.

4. A process as claimed in claim 3 in which there is used a dehydrogenating catalyst prepared by fixing freshly precipitated basic copper carbonate with water glass to a carrier, drying and reducing in a hydrogen stream at a temperature of 180° C.

JOSEF HILGER.